United States Patent
Johnston et al.

(10) Patent No.: US 8,515,030 B2
(45) Date of Patent: *Aug. 20, 2013

(54) SYSTEM AND APPARATUS FOR PROCESSING A COMMUNICATIONS SESSION

(75) Inventors: Janette A. Johnston, Irving, TX (US); Mostafa Tofighbakhsh, Cupertino, CA (US); Kaveh Hushyar, Saratoga, CA (US)

(73) Assignee: AT&T Intellectual Property I, LP, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/557,591

(22) Filed: Jul. 25, 2012

(65) Prior Publication Data

US 2012/0288070 A1 Nov. 15, 2012

Related U.S. Application Data

(63) Continuation of application No. 11/735,314, filed on Apr. 13, 2007, now Pat. No. 8,254,533.

(51) Int. Cl.
*H04M 1/64* (2006.01)
(52) U.S. Cl.
USPC .................. 379/88.14; 455/412.1

(58) Field of Classification Search
USPC ....... 379/67.1, 88.14, 88.17, 88.22; 455/412, 455/412.1; 709/217
See application file for complete search history.

(56) References Cited

U.S. PATENT DOCUMENTS

| 5,995,824 A * | 11/1999 | Whitfield ................... 455/412.1 |
| 6,222,909 B1 * | 4/2001 | Qua et al. ................... 379/88.22 |
| 6,366,651 B1 * | 4/2002 | Griffith et al. .............. 379/88.14 |
| 6,785,368 B1 | 8/2004 | Eason et al. |
| 6,987,841 B1 * | 1/2006 | Byers et al. ................. 379/88.17 |
| 2005/0107071 A1 | 5/2005 | Benco et al. |
| 2006/0140355 A1 | 6/2006 | Handekyn |
| 2007/0233806 A1 * | 10/2007 | Asadi ............................. 709/217 |
| 2010/0184409 A1 * | 7/2010 | Doulton ..................... 455/412.1 |

FOREIGN PATENT DOCUMENTS

WO   WO-2006/136266   12/2006

* cited by examiner

*Primary Examiner* — Mohammad Islam
*Assistant Examiner* — Van D Huynh
(74) *Attorney, Agent, or Firm* — Guntin & Gust, PLC; Jay H. Anderson

(57) ABSTRACT

A system and apparatus for processing a communications session is disclosed. A system that incorporates teachings of the present disclosure may include, for example, a communication device can have a controller element to establish a voice communication session with a second communication device, and initiate an action to record the voice communication session for translation into a text memo that is analyzed to identify one or more actionable fields. Additional embodiments are disclosed.

20 Claims, 3 Drawing Sheets

SYSTEM AND APPARATUS FOR PROCESSING A COMMUNICATIONS SESSION

CROSS-REFERENCE TO RELATED APPLICATIONS

This application is a continuation of and claims priority to U.S. patent application Ser. No. 11/735,314 filed Apr. 13, 2007, which is incorporated herein by reference in its entirety.

FIELD OF THE DISCLOSURE

The present disclosure relates generally to call processing techniques, and more specifically to a system and apparatus for processing a communications session.

BACKGROUND

On occasion mobile phone users call an information service of their mobile service provider while operating an automobile for purposes of requesting an address or someone's phone number. When the mobile phone user receives a phone number or address supplied by a telephone operator or automated system of the operator said user can attempt to write down this information; however, doing so can be dangerous, as it can also be dangerous to dial the given number. Trying to memorize the phone number or address can also be a challenge. Similar situations can arise during a telephone conversation between parties (e.g., a friend giving directions to another who may be lost).

A need therefore arises for a system and apparatus for processing a communication session.

DETAILED DESCRIPTION

Embodiments in accordance with the present disclosure provide a system and apparatus for processing a communication session.

In a first embodiment of the present disclosure, a computer-readable storage medium can have computer instructions for receiving a request from a first communication device to record an on-going voice communication session taking place between the first communication device and a second communication device, recording the voice communication session, translating content of the recorded voice communication session into a text memo, detecting one or more actionable fields in the text memo and presenting the one or more actionable fields to the first communication device upon termination of the voice communication session.

In a second embodiment of the present disclosure, a communication device can have a controller element to establish a voice communication session with a second communication device, and initiate an action to record the voice communication session for translation into a text memo that is analyzed to identify one or more actionable fields.

In a third embodiment of the present disclosure, a method can involve recording a multimedia communication session taking place between first and second communication devices, translating the recorded multimedia communication session into one or more actionable fields, and presenting the one or more actionable fields to the first communication device.

Figure 1:
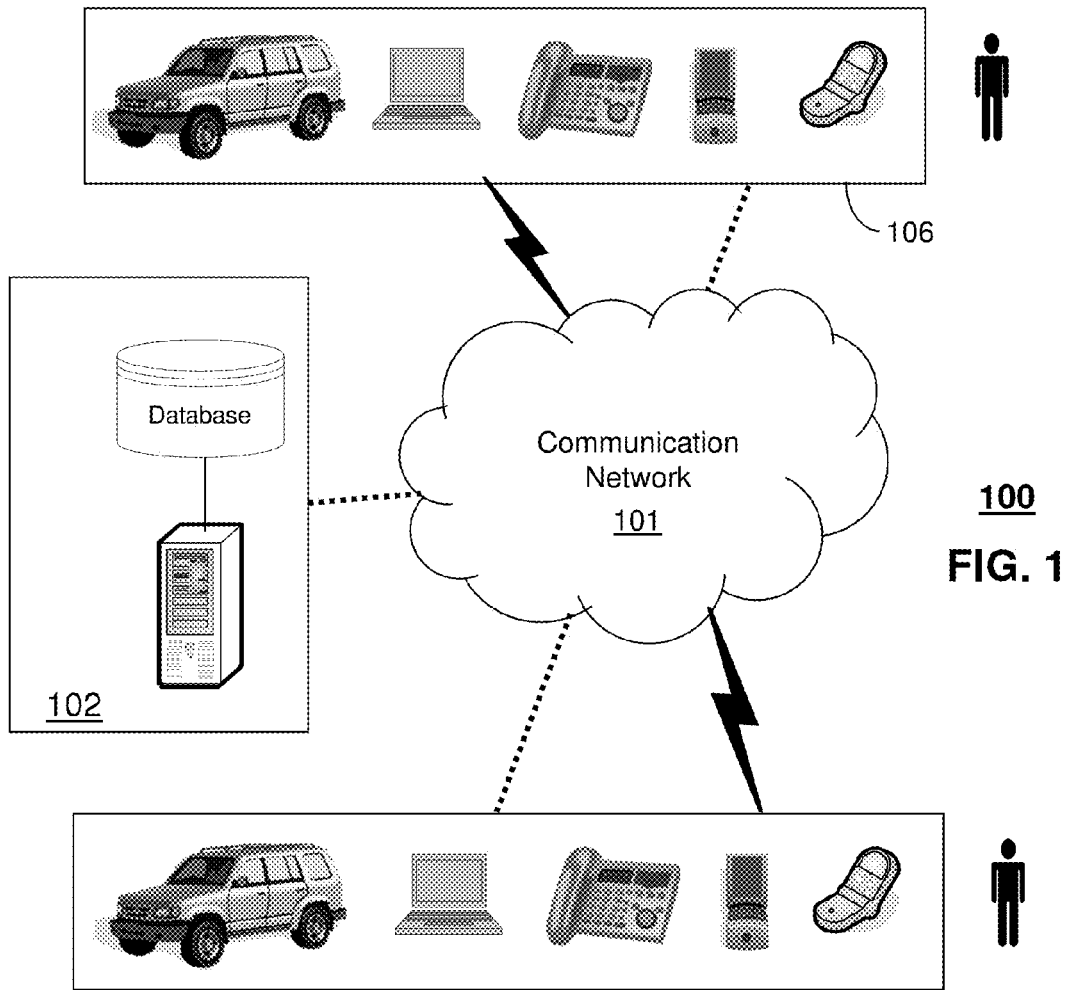
FIG. 1 depicts an exemplary embodiment of a communication system.

FIG. 1 depicts an exemplary embodiment of a communication system 100. The communication system 100 can comprise a processing system 102, and one or more communication devices 106 coupled to a communication network 101. The processing system 102, and communication devices 106 can utilize common computing and communication technologies to support circuit-switched and/or packet-switched communications such as Public Switched Telephone Network (PSTN) telephony, cellular voice telephony, and Voice over IP (VoIP) telephony operable in whole or in part in an IP Multimedia Subsystem (IMS) network.

The processing system 102 can be utilized to record live voice communications taking place by way of communication devices 106 of two or more parties. The processing system 102 can utilize common text-to-speech technology in combination with common pattern recognition technology to analyze a recorded voice session. The processing system 102 can also include technology such as found in an interactive voice response system (IVR) for presenting a party the analysis performed on the recorded voice session utilizing synthesized voice prompts, voice recognition, and detection of keyed input signals (e.g., DTMF tones) supplied by a communication device 106 of the user.

The communication network 101 can comprise a number of common network elements interconnected by wired or wireless interfaces that support packet-switched and/or circuit-switched technologies. The communications network 101 can thus offer communication devices 106 Internet and/or traditional voice services such as, for example, PSTN, VoIP, IPTV (Internet Protocol Television), broadband communications, cellular telephony, as well as other known or next generation access technologies.

The communication devices 106 can represent any number of embodiments including without limitation a laptop or desktop computer, a PSTN or VoIP phone, a personal digital assistance (PDA), or a cellular phone, just to name a few. Some or all of these devices can interface to the communication network 101 with a wired or wireless interface. For example, the laptop can be interconnected to the communications network 101 by a wired Ethernet port to a DSL (Digital Service Line) interface in a residence or enterprise, or by a WiFi or WiMAX wireless connection. The PSTN or VoIP phone can utilize cordless 2.4 GHz or 5.8 GHz technology for short-range roaming as well as cellular technology for long-range communications.

Figure 2:
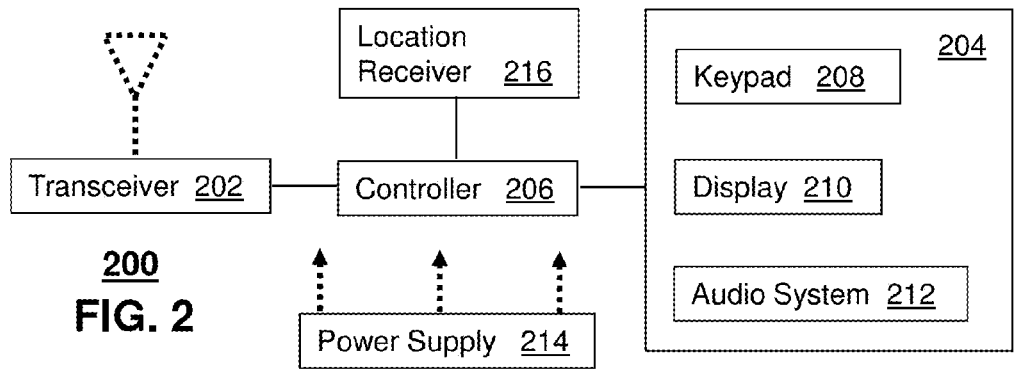
FIG. 2 depicts an exemplary communication device operating in portions of the communication system.

FIG. 2 depicts an exemplary embodiment of the communication device 106. A communication device 106 can comprise a wired and/or wireless transceiver 202, a user interface (UI) 204, a power supply 214, a location receiver 216, and a controller 206 for managing operations thereof.

In an embodiment where the communication device 106 operates in a landline environment, the transceiver 202 can utilize a common wireline access technology to support PSTN or VoIP services. In a wireless communications setting, the transceiver 202 can utilize common technologies to support singly or in combination any number of wireless access technologies including without limitation cordless phone technology (e.g., DECT), Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, GSM/GPRS, TDMA/EDGE, and EVDO. SDR can be utilized for accessing a public or private communication spectrum according to any number of communication protocols that can be dynamically downloaded over-the-air to the communication device. It should be noted also that next generation wireless access technologies can be applied to the present disclosure.

The UI 204 can include a keypad 208 with depressible or touch sensitive navigation disk and keys for manipulating operations of the communication device 106. The UI 204 can further include a display 210 such as monochrome or color LCD (Liquid Crystal Display) for conveying images to the end user of the communication device, and an audio system 212 that utilizes common audio technology for conveying and intercepting audible signals of the end user.

The power supply 214 can utilize common power management technologies such as replaceable batteries, supply regulation technologies, and charging system technologies for supplying energy to the components of the communication device and to facilitate portable applications. In stationary applications, the power supply 214 can be modified so as to extract energy from a common wall outlet and thereby supply DC power to the components of the communication device 106.

The location receiver 216 can utilize technology such as a common GPS (Global Positioning System) receiver that can intercept satellite signals which can be used to determine a location fix of the communication device 106.

The controller 206 can utilize computing technologies such as a microprocessor and/or digital signal processor (DSP) with associated storage memory such a Flash, ROM, RAM, SRAM, DRAM or other like technologies for controlling operations of the aforementioned components of the communication device.

Figure 3:
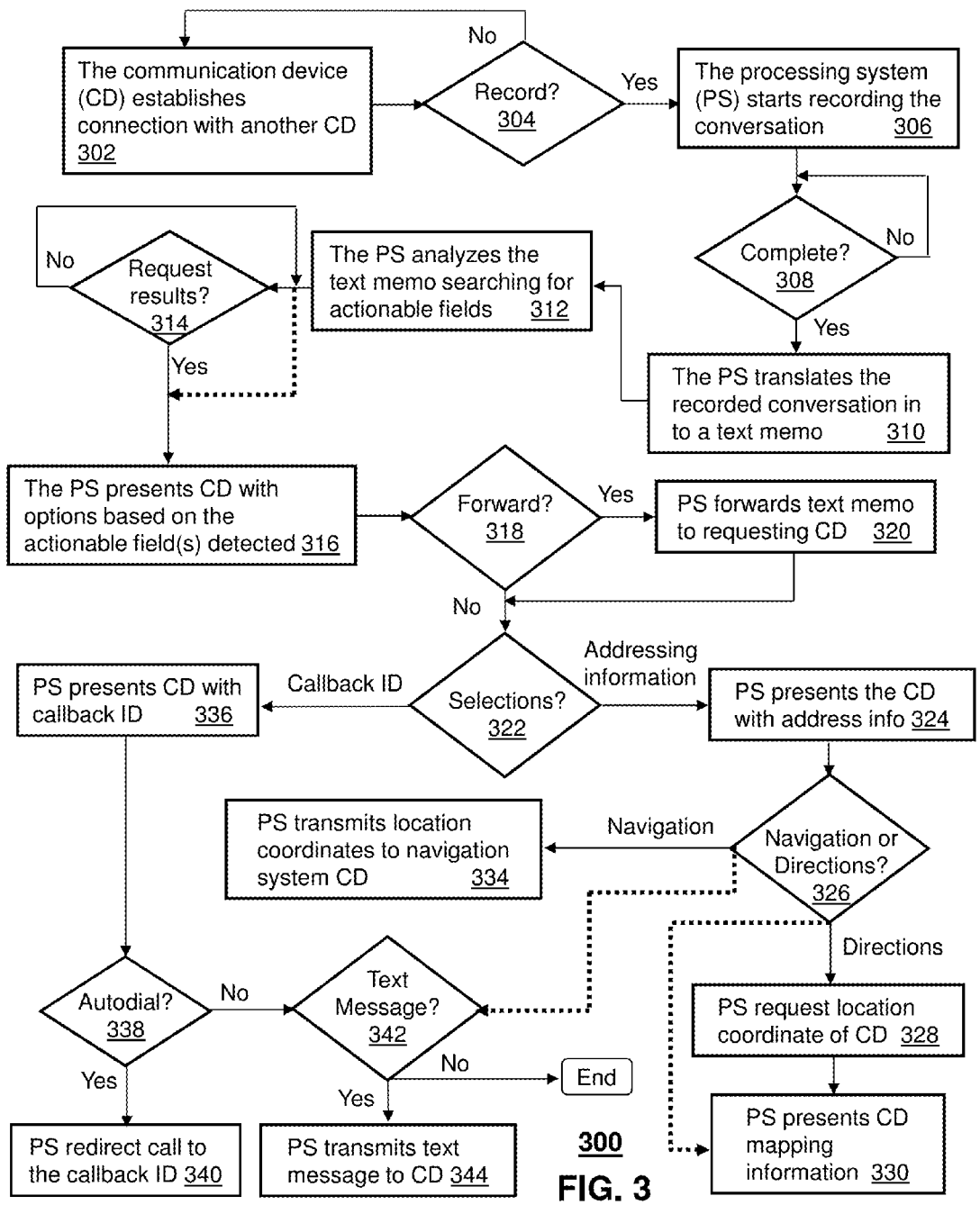
FIG. 3 depicts an exemplary method operating in the portions of the communication system.

FIG. 3 depicts an exemplary method 300 operating in portions of the communication system 100. Method 300 can begin with step 302 where a calling party initiates a call over the communication network 101 with a communication device 106 directed to another communication device 106 of a called party. In step 304 the processing system 102 can be programmed to monitor a request to record the communication session. The request can be invoked by signaling information such as one or more DTMF tones (e.g., depressing *1 on keypad 208) generated by the communication device 106 of the called or calling party. In the present context signaling information can mean signaling system 7 (SS7), Session Initiation Protocol (SIP) messages as used in an IMS network, or any other suitable form of signaling information. The DTMF tones can be detected by the processing system 102 or by the communication network 101 which can direct said information to the processing system 102 by common redirection means. In response to detecting the signaling information, the processing system 102 can proceed to step 306 where it begins to record an on-going live voice communication session between the calling and called parties.

In step 308, the processing system 102 can wait for additional signaling information to complete the recording session (e.g., depressing *2 on keypad 208) or an action taken by either party that affects the voice communication session (e.g. one or both parties discontinue the call by pressing the end key or hanging up the handset). Once the recording session has completed, the processing system 102 can translate the recorded conversation into a text memo using its speech-to-text synthesizer as shown in step 310.

In step 312 the processing system 102 can be programmed to analyze the text memo for actionable fields. An actionable field in the present context can mean an email address, phone number, location coordinates, an address or any other suitable form of actionable information. Actionable fields can be detected by common pattern recognition techniques and processed by common parsing techniques. For example, a phone number can be detected by detecting 7 or 10 contiguous numbers in the text memo. An email address can be detected by common email formats with an @ sign, domain name, extensions (.com, .net, .org, etc.). An address can be determined by searching a city, state and associated address details.

When potential actionable fields are detected by the processing system 102 they can be further analyzed for validity. For example, in the case of phone numbers the processing system 102 can check for the validity of the NPA code, also known as an area code. If the first three digits of a 10 digit numeric string corresponds to a known area code, the processing system 102 can proceed to test the validity of the NXX field, also known as an exchange. If both the NPA and NXX codes are valid, the processing system 102 can then check the entire 10 digit number to determine if it is a valid phone number. The foregoing tests can be performed by the processing system 102 by querying its own database and/or known telephony databases to determine the validity of a phone number. Similar techniques can be applied to potential SIP uniform resource identifiers (SIP URIs) and/or Tel URIs detected by the processing system 102.

These techniques can also be used on emails and site or building addresses. For example, in the case of an email, the processing system 102 can check by common means the domain name of the email for validity as well as its extension. If these fields are valid, the processing system 102 can further check by common means the remaining fields of the email address for validity. Addresses of buildings or sites can be parsed by city, state, zip code, and street address by common means also to determine its validity. With these and other suitable pattern recognition techniques, the processing system 102 can determine if one or more actionable fields are present in the text memo.

In step 314, the processing system 102 can be programmed to wait for a call from either the called or calling party, or the party that invoked the request to record the communication session in step 304. Once a call is detected by the processing system 102 from a communication device 106 of either party, the processing system 102 retrieves the text memo from its memory indexed by, for example, a caller ID of either party, and proceeds to step 316 where it presents the communication device 106 with options to process the actionable fields detected in the text memo. Alternatively, the processing system 102 can skip step 314 and proactively establish a voice communication session with the communication device 106 that requested the recording in step 304 after the parties have terminated the call, and can present options to process the actionable fields as described earlier for step 316.

In this step, the processing system 102 can use common voice synthesis techniques such as those of the IVR referred to earlier to notify the user that an address, a phone number and/or an email address were detected in a text memo synthesized from the voice conversation. The processing system 102 can use an IVR call processing flow to present the user with one or more options for processing the actionable fields. For example, the processing system 102 in step 318 can present the user an option to forward the text memo in step 320 using a short message system (SMS) message, or email to the communication device 106 of said user or any other communication device identified by the user.

In the present illustration it will be assumed that two actionable fields were detected: a callback ID (such as a telephone number) and an address of a particular building or site. Accordingly, in step 322, the user of the communication device 106 can select either actionable field by depressing a key on keypad 208 or stating a number or preferred selection according to the speech instructions of the processing system 102. If for example the callback ID is selected, the processing system 102 can proceed to step 336 where it presents the communication device 106 with the callback ID number (e.g., the IVR states the phone number and asks the user if s/he would like to autodial this number). In step 338, the user can request an autodial of the callback ID, in which case the processing system 102 redirects the call to the callback ID. If an autodial function is not selected, the user can request in step 342 that the processing system 102 transmit in step 344 a text message with the callback ID.

Referring back to step 322, the user can instead select the addressing information detected. In this case, the processing system 102 proceeds to step 324 where it presents the communication device 106 with the addressing information in a synthesized speech format (e.g., "the address XXX, in city YYY" was detected in the voice communication session. Would you like navigation or direction instructions?"). The IVR function of the processing system 102 can then give the user the option to choose in step 326 directions or navigation instructions. If directions are chosen, the processing system 102 proceeds to step 328 where it requests a location coordinate from the communication device 106 (e.g., GPS reading of the location receiver 216). In step 330, the processing system 102 can present the communication device 106 a map with directions from a position of the communication device 106 (based on the GPS reading supplied by the communication device 106) to the address detected in the text memo using common mapping techniques. The map can be graphical and/or textual, and can be transmitted to the communication device 106 as an email, an SMS message, or a multimedia message service (MMS) message. If the communication device 106 does not have a GPS receiver, the processing system 102 can skip step 328 and present at step 330 a map that highlights the site location of the address with an asterisk or arrow accompanied by streets and intersections.

If on the other hand, the navigation option is selected in step 326, the processing system 102 can proceed to step 334 where it transmits the location coordinates of the detected address to a navigation system of the communication device 106. In this embodiment the communication device 106 can represent a telemetry system of an automobile that has a built-in navigation system. Alternatively, the communication device 106 can represent a cell phone or laptop computer with a navigation system. In either case, common navigation techniques can be used to direct the user of the communication device 106 to the detected address.

The aforementioned embodiments of method 300 can provide a user a convenient means to synthesize actionable fields in a voice conversation without significant interruption to the user's activities. For instance, method 300 can be applied while a user is operating an automobile without encumbering the user to take notes or attempt to memorize points made during the call. With the autodial function, the user can easily start a new call with minimal effort. Similarly, the user can get navigation instructions to a detected address without interrupting the user's attention while driving.

From these embodiments, it would be evident to an artisan with ordinary skill in the art that the present disclosure can be modified, reduced, or enhanced without departing from the scope and spirit of the claims described below. For example, the processing system 102 can be an integral part of a voice-mail and/or location services system. The processing system 102 can be programmed in steps 330, 334, and 340 to return to step 322 in the event the user wants to process other actionable fields. An actionable field can also include an instant messaging address, phonebook contacts, or other identifiable fields including multimedia data such as ringtones, songs, and/or still and moving pictures. The processing system 102 can be programmed in this embodiment to tag these additional fields for extraction, forwarding, and/or reuse at a communication device 106 of a requesting party. Additionally, the embodiments of method 300 can operate in whole or in part in either of the communication devices 106, thereby foregoing a need for the processing system 102.

These are but a few examples of modifications that can be applied to the present disclosure without departing from the scope of the claims. Accordingly, the reader is directed to the claims section for a fuller understanding of the breadth and scope of the present disclosure.

Figure 4:
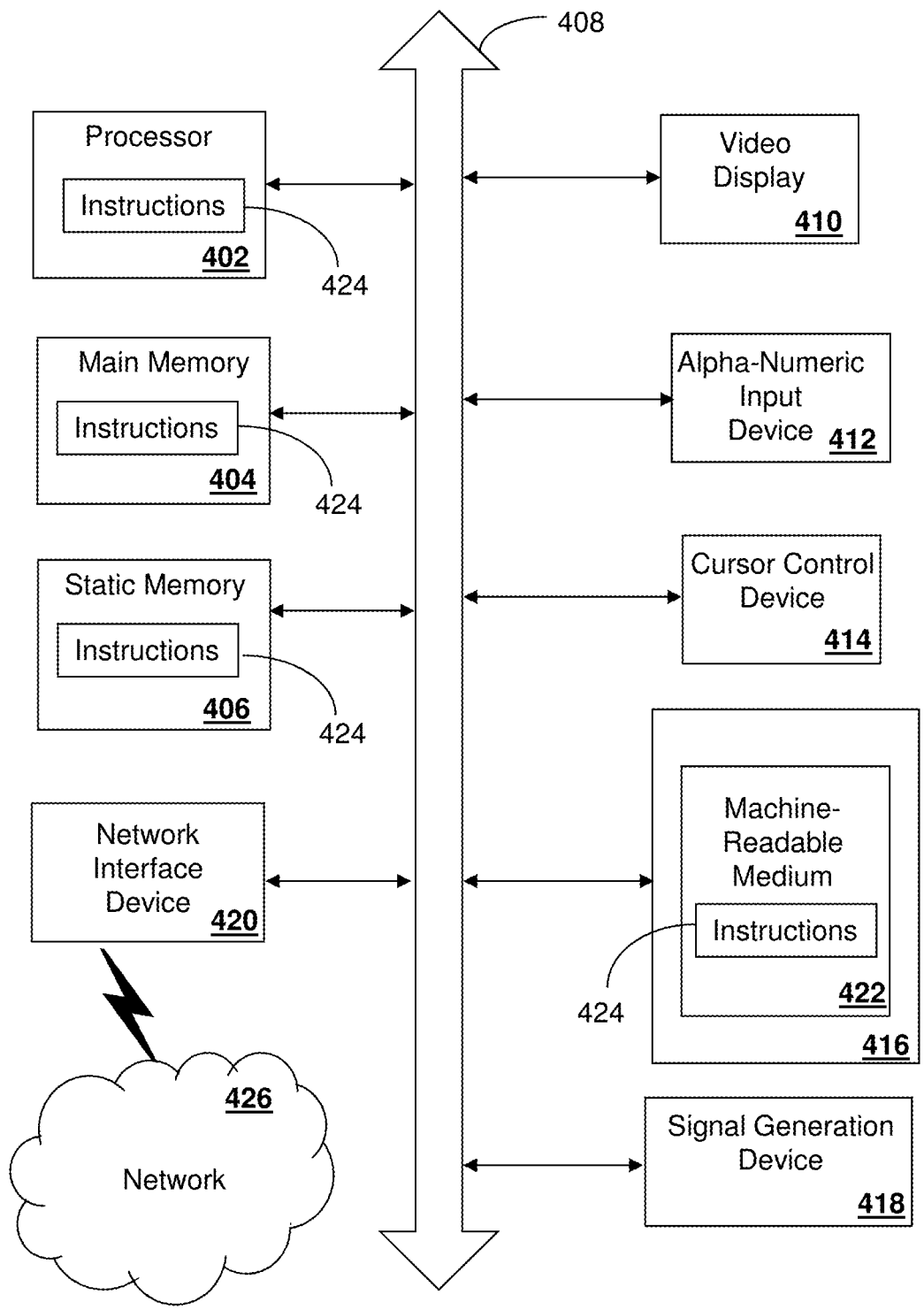
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a mass storage medium 416, a signal generation device 418 (e.g., a speaker or remote control) and a network interface device 420.

The mass storage medium 416 may include a computer-readable storage medium 422 on which is stored one or more sets of instructions (e.g., software 424) embodying any one or more of the methodologies or functions described herein, including those methods illustrated above. The computer-readable storage medium 422 can be an electromechanical medium such as a common disk drive, or a mass storage medium with no moving parts such as Flash or like non-volatile memories. The instructions 424 may also reside, completely or at least partially, within the main memory 404, the static memory 406, and/or within the processor 402 during execution thereof by the computer system 400. The main memory 404 and the processor 402 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the computer-readable storage medium 422 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions which, responsive to being executed by a processor, cause the processor to perform operations comprising:

obtaining recorded content by recording at least a portion of a voice communication session between first and second end user devices utilizing a recording device integrated with the first end user device without utilizing a remote recording system;

detecting an actionable field in the recorded content;

analyzing a validity of the actionable field by parsing of identification information of the actionable field;

activating the actionable field for selection at the first end user device responsive to the analyzing, wherein the actionable field enables initiating another communication session based on the identification information of the actionable field; and presenting the actionable field at the first end user device responsive to termination of the voice communication session.

2. The non-transitory computer-readable storage medium of claim 1, comprising computer instructions which, responsive to being executed by the processor, cause the processor to perform operations comprising:

translating the recorded content into a text memo utilizing the first end user device, wherein the recording of the at least a portion of the voice communication session is in response to a user input request.

3. The non-transitory computer-readable storage medium of claim 1, comprising computer instructions which, responsive to being executed by the processor, cause the processor to perform operations comprising: detecting the actionable field by pattern recognition performed at the first end user device, wherein the actionable field includes a ring tone.

4. The non-transitory computer-readable storage medium of claim 1, comprising computer instructions which, responsive to being executed by the processor, cause the processor to perform operations comprising: detecting from the actionable field a callback identification and a location coordinate.

5. The non-transitory computer-readable storage medium of claim 4, comprising computer instructions which, responsive to being executed by the processor, cause the processor to perform operations comprising:

receiving at an user interface of the first end user device a geographic instructions request for the location coordinate, wherein the request is responsive to an interactive voice response prompt generated by the first end user device;

creating a map associated with the location coordinate; and presenting the map at the first end user device, wherein the map indicates the location coordinate.

6. The non-transitory computer-readable storage medium of claim 5, wherein the geographic instructions request comprises another location coordinate of the first end user device, and wherein the map comprises navigation directions from the other location coordinate of the first end user device to the detected location coordinate.

7. The non-transitory computer-readable storage medium of claim 5, comprising computer instructions which, responsive to being executed by the processor, cause the processor to perform operations comprising:

receiving at the user interface of the first end user device a request to forward the detected location coordinate to a navigation system; and providing the detected location coordinate to the navigation system, wherein the navigation system is an integral part of an automobile, and wherein the navigation system provides navigation instructions according to the detected location coordinate.

8. The non-transitory computer-readable storage medium of claim 1, comprising computer instructions which, responsive to being executed by the processor, cause the processor to perform operations comprising:

checking the validity of the actionable field prior to the presenting of the actionable field at the first end user device.

9. The non-transitory computer-readable storage medium of claim 8, comprising computer instructions which, responsive to being executed by the processor, cause the processor to perform operations comprising:

presenting at the first end user device the actionable field according to an interactive voice response system.

10. A communication device, comprising:

a memory storing computer instructions;

a recording device: and a controller element coupled with the memory and the recording device, wherein the controller element, responsive to executing the computer instructions, performs operations comprising:

obtaining content by recording at least a portion of a communication session between first and second end user devices utilizing a recording device integrated with the first end user device without utilizing a remote recording system;

detecting an actionable field in the content;

analyzing a validity of the actionable field by parsing of identification information of the actionable field;

activating the actionable field for selection at the first end user device responsive to the analyzing, wherein the actionable field enables initiating another communication session based on the identification information of the actionable field; and presenting the actionable field at the first end user device.

11. The communication device of claim 10, wherein the analyzing of the validity is performed prior to the presenting of the actionable field at the first end user device.

12. The communication device of claim 10, wherein the presenting of the actionable field at the first end user device is responsive to termination of the communication session.

13. The communication device of claim 10, wherein the communication session comprises a voice communication session, and wherein the detecting of the actionable field in the content comprises:

translating the content into a text memo utilizing pattern recognition software stored in the memory; and analyzing the text memo to identify the actionable field.

14. The communication device of claim 10, wherein the controller element, responsive to executing the computer instructions, performs operations comprising:

receiving a geographic instructions request for a location coordinate of the actionable field;

creating a map associated with the location coordinate; and presenting the map at a display device, wherein the map indicates the location coordinate.

15. The communication device of claim 10, wherein the controller element, responsive to executing the computer instructions, performs operations comprising: providing an interactive voice response prompt to initiate another communication session with another device based on the actionable field.

16. The communication device of claim 10, comprising a navigation system, wherein the controller element presents navigation instructions according to a location coordinate associated with the actionable field.

17. The communication device of claim 10, wherein the identification information includes at least one among an email address, a telephone number, or a location coordinate.

18. A method, comprising:

obtaining, by a recording device, recorded content by recording at least a portion of a voice communication session between first and second end user devices;

detecting, by a processor, an actionable field in the recorded content;

analyzing, by the processor, a validity of the actionable field by parsing identification information of the actionable field;

activating the actionable field for selection at the first end user device responsive to the analyzing, wherein the actionable field enables initiating another communication session based on the identification information of the actionable field; and presenting the actionable field at the first end user device responsive to termination of the voice communication session.

19. The method of claim 18, wherein the identification information includes at least one among an email address, a telephone number, or a location coordinate, and wherein the activating of the actionable field is responsive to termination of the voice communication session.

20. The method of claim 18, wherein the first end user device comprises the processor and the recording device, and wherein the recorded content is obtained without utilizing a recording system that is remote from the first end user device.

* * * * *